(12) United States Patent
Alsleben

(10) Patent No.: US 6,816,149 B1
(45) Date of Patent: Nov. 9, 2004

(54) COMPUTER INPUT DEVICE

(76) Inventor: Marte Alsleben, 735 Woodland Rd., Mansfield, OH (US) 44906

( * ) Notice: Subject to any disclaimer, the term of this patent is extended or adjusted under 35 U.S.C. 154(b) by 93 days.

(21) Appl. No.: 10/128,607

(22) Filed: Apr. 23, 2002

Related U.S. Application Data

(60) Provisional application No. 60/286,413, filed on Apr. 25, 2001, and provisional application No. 60/322,906, filed on Sep. 17, 2001.

(51) Int. Cl.[7] .................................................. G09G 5/08
(52) U.S. Cl. ........................ 345/163; 374/161; 116/216
(58) Field of Search ................................. 345/106, 163, 345/168, 156; 340/636.14; 374/141, 162, 161; 116/207, 216; 349/194; 463/36, 37; 700/83, 84, 85

(56) References Cited

U.S. PATENT DOCUMENTS

| | | |
|---|---|---|
| 4,642,250 A | 2/1987 | Spector |
| D291,203 S | 8/1987 | Silver |
| 5,245,146 A | 9/1993 | Florence |
| 5,376,699 A | 12/1994 | Sage |
| 5,503,583 A * | 4/1996 | Hippely et al. ................ 446/14 |
| 5,549,267 A | 8/1996 | Armbruster et al. |
| D381,015 S | 7/1997 | Morrison et al. |
| D386,164 S | 11/1997 | Silberstein |
| 5,851,623 A | 12/1998 | Tarulli et al. |
| D420,339 S | 2/2000 | Burke |
| D420,992 S | 2/2000 | Hu |
| 6,040,539 A | 3/2000 | Hiegel |
| 6,195,085 B1 | 2/2001 | Becker et al. |
| 6,241,386 B1 * | 6/2001 | Limburg et al. ............. 374/162 |
| 6,296,911 B1 * | 10/2001 | Catarineu Guillen ........ 428/29 |
| 6,466,299 B1 * | 10/2002 | Lehtiniemi et al. ......... 349/199 |
| 6,690,362 B1 * | 2/2004 | Motoyama et al. ......... 345/173 |
| 2001/0046115 A1 | 11/2001 | Genicevitch |

* cited by examiner

*Primary Examiner*—Chanh Nguyen
*Assistant Examiner*—Paul A. Bell
(74) *Attorney, Agent, or Firm*—Christopher L. Parmelee; Walker & Jocke LPA

(57) ABSTRACT

An input device comprising an input mechanism for a computer system. The input mechanism is operative responsive to movements of a user of the device to send inputs to a computer system. An exterior surface of the input mechanism is operative to come in contact with the user of the device. At least one portion of the exterior surface is comprised of color changing material that is operative to turn at least one different color responsive to an increase in temperature, pressure, or changes in light exposure to the color changing material caused by contact with the user of the device.

24 Claims, 9 Drawing Sheets

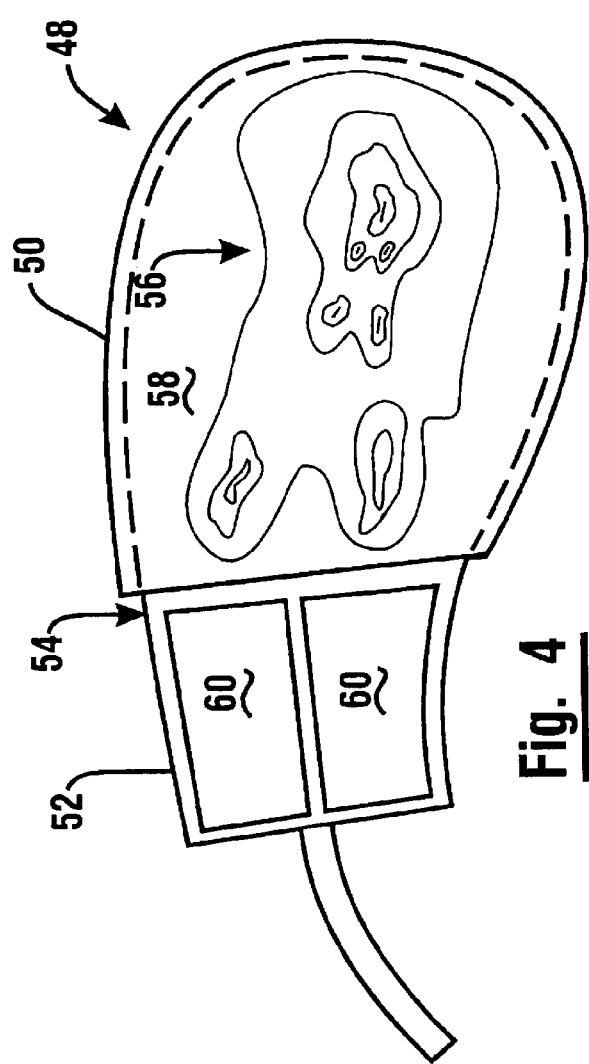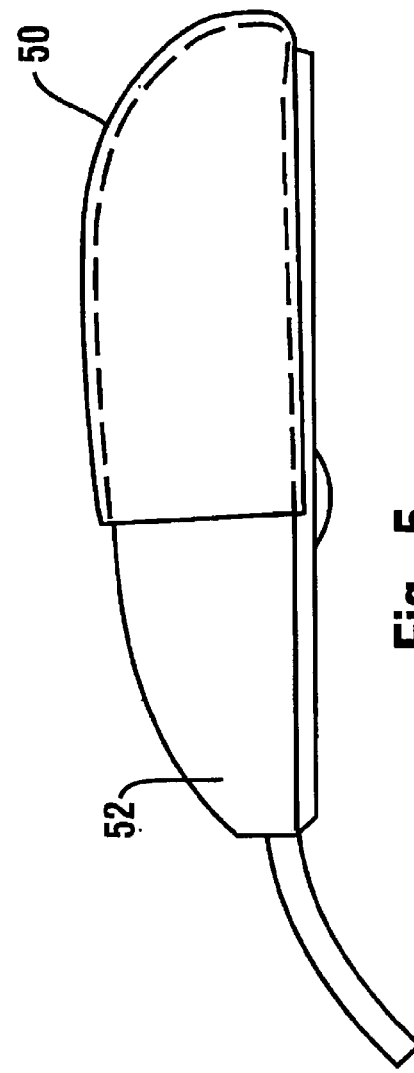
Fig. 4
Fig. 5

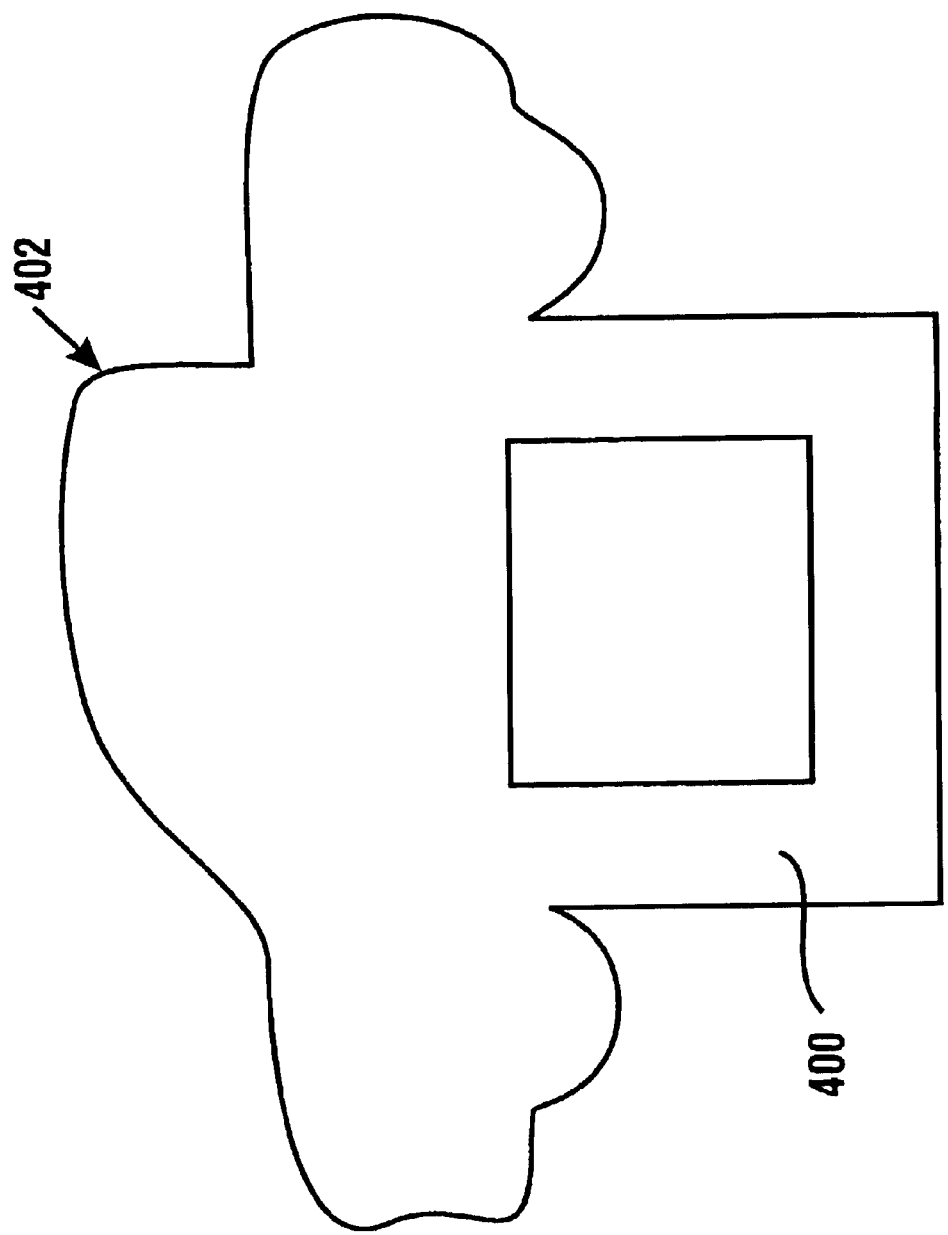

COMPUTER INPUT DEVICE

CROSS REFERENCE TO RELATED APPLICATIONS

This application claims benefit of U.S. Provisional Application Ser. Nos. 60/286,413 filed Apr. 25, 2001 and 60/322,906 filed Sep. 17, 2001.

TECHNICAL FIELD

This invention relates to computer input devices. Specifically this invention relates to a computer input device such as a mouse that includes an outer surface which is operative to change colors responsive to changes in the temperature, light, and/or pressure on the surface of the mouse caused by a hand of a user.

BACKGROUND ART

Computer input devices are well known. Common types of computer input devices include a computer mouse, a keyboard, a track ball, a finger pad, and a finger pointer. Such devices enable consumers to communicate with their personal computer system. For example, many computer systems enable a consumer to operate the computer through movement of a mouse or other pointing device. As the mouse is moved across a mouse pad, such systems move a corresponding graphical pointer across a computer display. In addition, such computer systems are responsive to clicks of one or more mouse buttons to initiate operations with the computer system, such as the running of programs and the navigation of menus.

Many computers and associated input devices that have been built since the 1980s generally have a common off-white, grey color. Many users find such computers to be visually undesirable and impersonal. As a result there is a need for users to modify the appearance of their computer systems and associated input devices to create a more visually appealing and individualized work and play environment. One method in which users visually individualize their computers is through the use of graphically diverse screen savers and desktop themes. In addition consumers often use distinctive mouse pads which have logos, pictures, or other graphic designs which the consumer finds visually appealing and distinctive. As many users continuously endeavor to find new and creative opportunities to personalize their computer systems, there exists a need for further systems and methods for enabling consumers to visually individualize their personal computers.

DISCLOSURE OF INVENTION

It is an object of the exemplary form of the present invention to provide a computer input device.

It is a further object of the exemplary form of the present invention to provide a computer input device which is visually distinctive.

It is a further object of the exemplary form of the present invention to provide a computer mouse which is visually distinctive.

It is a further object of the exemplary form of the present invention to provide an apparatus for making existing input devices visually distinctive.

It is a further object of the exemplary form of the present invention to provide an apparatus for making existing computer mice visually distinctive.

It is a further object of the exemplary form of the present invention to provide an apparatus for visually personalizing an input device.

It is a further object of the exemplary form of the present invention to provide an apparatus for visually personalizing a computer mouse.

Further objects of the present invention will be made apparent in the following Best Modes for Carrying Out Invention and the appended Claims.

The foregoing objects may be accomplished in an exemplary embodiment of the invention by an input device such as a computer mouse or other hand operative input device which is operative to visually change in appearance responsive to contact by a user.

In the exemplary embodiment, a computer mouse or other input device may include an outer surface which is operative to change colors responsive to changes in temperature of the outer surface. For example when a user grasps a mouse with his/her hands and fingers, the exemplary computer mouse of the present invention may be operative to change colors responsive to heat being passed into the outer surface of the computer mouse from the hand of the user. The acquisition of heat from a user's hand is operative to raise the temperature of the surface of the mouse. Responsive to the amount of increase in temperature of the mouse surface, one or more different colors may become visible on the surface of the mouse in the general location of the user's hand. In alternative exemplary embodiments, the mouse may be operative to change colors responsive to changes in light intensity or light frequency reaching the surface of the mouse. In other exemplary embodiments, the color changing material may be operative to change colors responsive to changes in pressure causes by the hand of the user contacting the mouse.

In the exemplary embodiment, the outer surface of the computer mouse may be operative to retain the resulting change in color for a period of time after the hand of the user is removed from the computer mouse. As a result when the hand of a user is removed from the mouse, the user may, for a period of time, visually perceive the different colors formed in the surface of the mouse. In addition as the surface of the mouse cools to ambient room temperature, the user may be enabled to visually watch the colors fade from the surface of the computer mouse. In one exemplary embodiment color retention characteristics may be achieved by using materials for the surface and/or base of the mouse which have a high heat capacity and thus are operative to retain heat for many seconds after a hand is removed.

In alternative exemplary embodiments, the surface of the computer mouse may be responsive to different levels of temperature change in the surface to produce a visually appealing spectrum of different colors in the outer surface. In one exemplary embodiment the color shade and chroma across the surface of the mouse may be uniformly responsive to temperature. In other exemplary embodiments, different portions of the outer surface of the computer mouse may change to different colors responsive to changes in temperature. Thus when the surface is heated by a user's hand, distinctive patterns, shapes, logos, or other visually appealing graphical patterns may become visible on the surface of the mouse.

In such exemplary embodiments, as the temperature of the surface of the mouse returns to an ambient room temperature after removal of a hand or finger, the heated surfaces of the computer mouse may be operative to cycle through a plurality of different colors or shades of a color before fading away to a uniform color which corresponds to an unheated surface.

In one exemplary embodiment, the temperature responsive color changing surfaces of the mouse may be integrated into the outer shell of the mouse. In further exemplary embodiments, the temperature responsive color changing surfaces may be integrated into a covering for the mouse such as a plastic, paper or cloth sheet or shell which can be used to cover or encase a pre-existing computer mouse. Such a sheet or shell covering may include an adhesive layer which is operative to stick to the top surface of a pre-existing mouse. Such an adhesive layer may further enable the sheet or shell covering to be removable from the top surface of the pre-existing mouse without leaving portions of the adhesive on the top surface of the mouse. In a further alternative exemplary embodiment, other computer input devices such as trackballs, finger pads, joysticks, game controllers, and finger pointers may include temperature responsive color changing surfaces.

BRIEF DESCRIPTION OF DRAWINGS

FIG. 4 is a top plan view representative of an exemplary embodiment of a computer mouse cover of the present invention after a hand of a user has been removed.

FIG. 5 is a side plan view representative of an exemplary embodiment of a computer mouse cover of the present invention.

FIG. 10 shows a front plan view representative of a further exemplary embodiment of a monitor frame of the present invention.

BEST MODES FOR CARRYING OUT INVENTION

Figure 1:
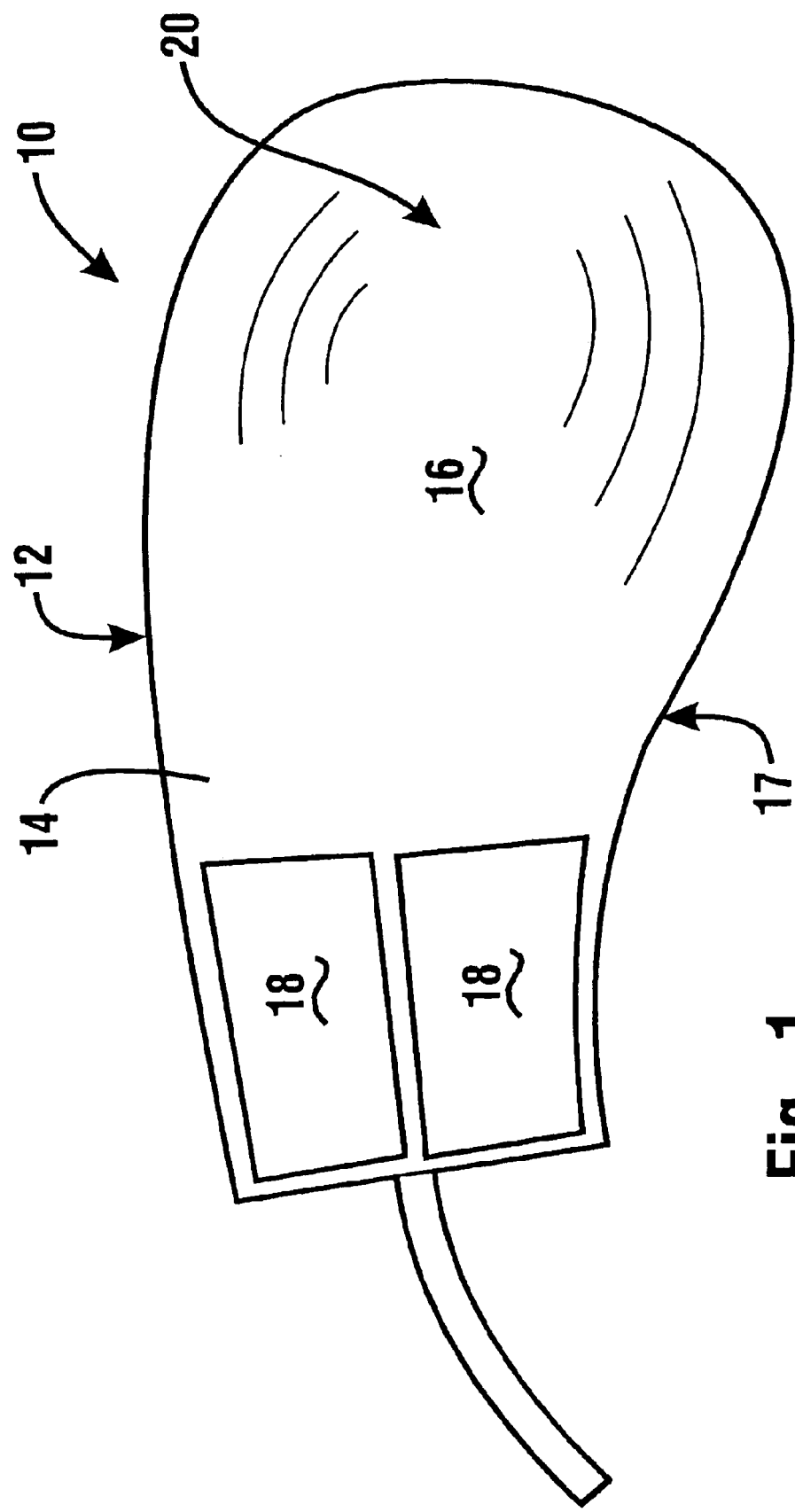
FIG. 1 is a top plan view representative of an exemplary embodiment of a computer mouse of the present invention at ambient room temperature.

Referring now to the drawings and particularly to FIG. 1, there is shown therein a top plan view of an input device 10 of one exemplary embodiment of the present invention. The input device is comprised of an input mechanism 12 that is operative responsive to movements of the device by a user to send inputs to a computer system. As shown in FIGS. 1–6 the input mechanism 12 may correspond to a computer mouse 14. However, in alternative exemplary embodiments, the input mechanism 12 may correspond to a track ball, keyboard, joystick, touch pad, game controller, joystick, or any other computer input mechanism which comes in contact with the hand of a user.

In an exemplary embodiment of the present invention, the computer mouse 14 or other input mechanism includes a body 17 such as a base, housing, shell, button or other structure which comes in contact with the hand of the user. For an input mechanism such as a computer mouse 14, such a body 17 may include a rounded mouse body 16 and/or one or more mouse buttons 18. Generally to use a computer mouse, a user places the palm of their hand on top of the mouse body 16 with their fingers adjacent the mouse buttons 18. Many computer systems are operative responsive to mouse signals representative of the mouse being moved by a user in order to move a graphical pointer across a display screen of the computer system. Such computer systems are further operative to perform functions such as the opening of a program responsive to receiving mouse signals representative of the buttons 18 being pressed by a user.

Other types of input devices such as a keyboard may include exterior surfaces which are contacted by the user such as the keys of the keyboard. A game controller for example may include exterior surfaces such as a joystick, paddle, buttons and/or base, which are often in contact with the hand of the user.

In the exemplary embodiment, at least one portion of the exterior surfaces of the input mechanisms may be comprised of a material which is operative to change colors responsive to temperature changes in the material caused by the user contacting the exterior surface. In the exemplary embodiment of the present invention the color changing material of the exterior surface may be operative to have a first color when the color changing material is at an ambient room temperature. When a user contacts the color changing material, heat transferring into the color changing material from the user's hand may be operative to raise the temperature of the color changing material. As the temperature increases, the color changing material may be operative to change to at least one other second color. When the hand of the user is removed from contacting the color changing material of the exterior surface, the color changing material may be operative to decrease in temperature and fade back to the first color as the temperature of the color changing material approaches ambient room temperature.

Figure 2:
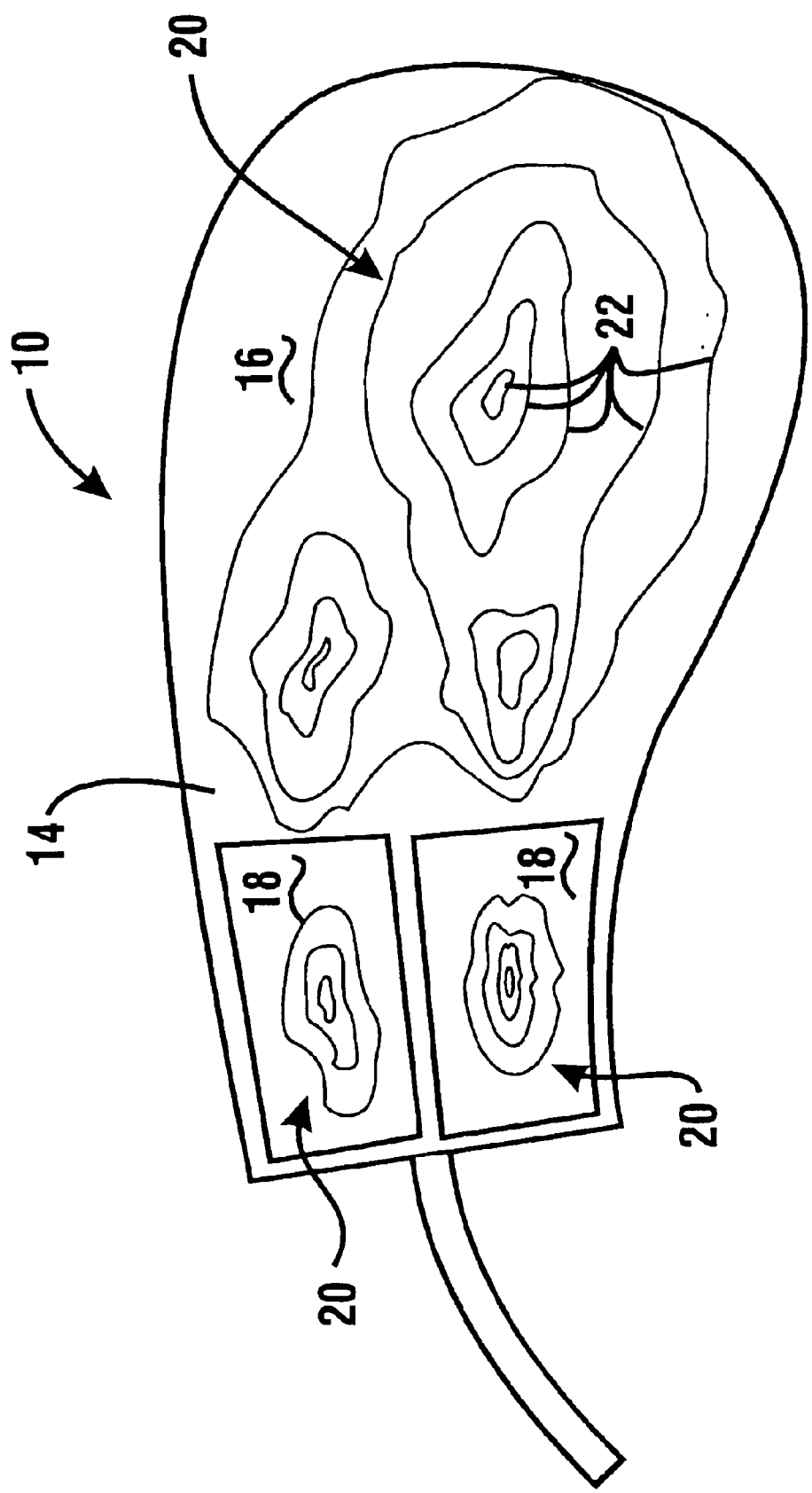
FIG. 2 is a top plan view representative of an exemplary embodiment of a computer mouse of the present invention after a hand of a user has been removed.

FIG. 2 shows an exemplary embodiment of the computer mouse 14 immediately after a hand of a user has been removed from contacting the exterior surfaces 16, 18. Here the exterior surfaces 16, 18 may be comprised of a color changing material 20 which has turned a plurality of different colors or shades of a color responsive to the respective regions 22 of the exterior surface having different temperatures. In the exemplary embodiment, the color changing material 20 may have a high heat capacity that is operative to dissipate heat at a sufficiently slow rate to enable the colored regions 22 to remain visible by the user after removal of his/her hand from the mouse. In one exemplary embodiment the colored regions may remain visible for many seconds.

Figure 3:
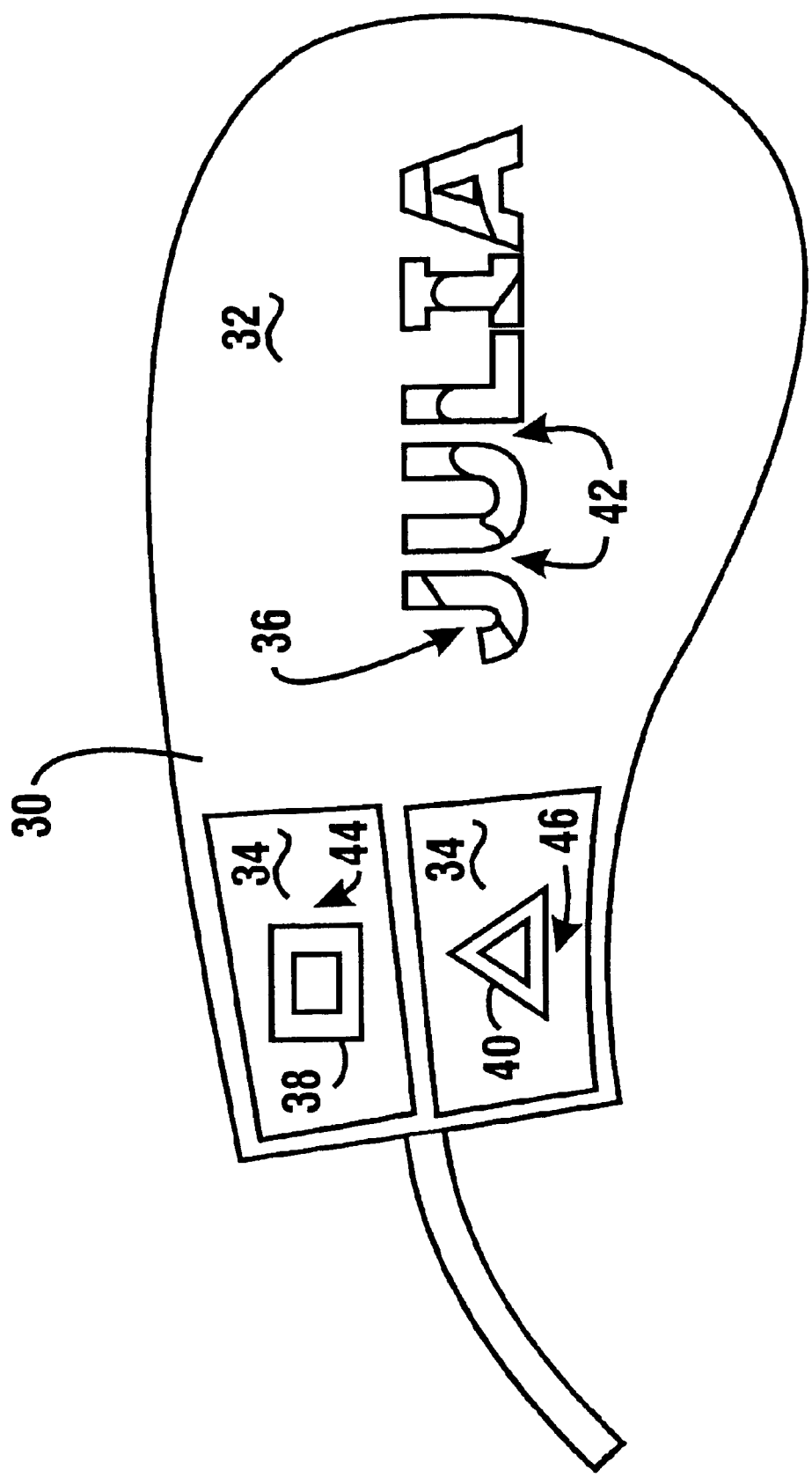
FIG. 3 is a top plan view representative of an alternative exemplary embodiment of a computer mouse of the present invention after a hand of a user has been removed.

FIG. 3 shows an alternative exemplary computer mouse 30 of the present invention immediately after a hand of a user has been removed from contacting the exterior surfaces 32, 34 of the mouse. Here, portions 36, 38, 40 of the exterior surfaces 32, 34 may include color changing material which has turned one or more different colors responsive to heat from the user's hand increasing the temperature of the portions 36, 38, 40. In this exemplary embodiment the portions 36, 38, 40 include graphical shapes and configurations which are bounded by portions 42, 44, 46 of the exterior surfaces which are not comprised of a color changing material. As a result when the temperature of the exterior surfaces 32 and 34 increases, the graphical shapes of the portions 36, 38, 40 of the exterior surface may become visibly perceptible by a user.

In the exemplary embodiment of the present invention, exterior surfaces of input devices may include regions of color changing material in the shapes of logos, images of objects, letters, numbers, words, names or any other visually perceptible symbol or graphical image. In a further exemplary embodiment surrounding portions 42, 44, 46 may be comprised of a second type of color changing material which is operative to change to different colors for corresponding temperature levels or ranges compared to graphical shape portions 36, 38, 40. Also the surrounding portions 42, 44, 46 may be comprised of a second type of color changing material which is operative to change colors at different temperature levels or ranges compared to graphical shape portions 36, 38, 40. As a result of the different color changing characteristics between portions 36, 38, 40 and portions 42, 44, 46, different patterns of colors may appear and disappear responsive to changes in the temperature of the exterior surface.

In a further exemplary embodiment, different regions with different color changing materials or characteristics may have different symbols or words which change colors at different temperature ranges. As a result, different symbols or words may become visible at different time periods depending on how much heat the hand of the user has imparted into the exterior surface. For example, if a user has a relatively cold hand, a first set of symbols or words may appear. However, if the user or a different user has a relatively warmer hand, a second set of colors, symbols or words may appear.

In one exemplary embodiment the different sets of words or symbols may be associated with adjectives representative of a mood or other objective or subjective state of the user which may correspond to the temperature of the user. For example the first set of color changing materials may become visible at a relatively low increase in temperature with a color, phrase or symbol which indicates that the user may be "cold," "relaxed," or "indifferent." A second set of color changing materials may become visible at relatively higher temperatures with a color, phrase or symbol which indicates that the user may be "hot," "excited," or "energetic."

To prevent both sets of words or symbols from being visible at the same time, the portions of the exterior surfaces around the first set of color changing material may change to the same color as the first set of color changing material when the exterior surface has a relatively higher temperature. As a result the first portion of color changing material will blend in with the surrounding portions of the exterior surface and visually appear to disappear as the temperature increases.

In exemplary embodiments, the color changing materials may be either integrated into the plastic body of the input device or may be integrated into a covering which is applied to the outer surface of the input device. FIG. 4 shows a top plan view of an alternative exemplary embodiment 48 of the present invention in which the color changing material 56 may be integrated into an exterior surface 58 of a covering 50 such as a coating, sheet or enclosure which is operative to cover an outer surface of an input device 54. Here the covering 50 is shown encasing a portion of a computer mouse 52. The exemplary embodiment of the covering 50 may be operative to releasably cover or encase portions of the mouse which come in contact with a user's hand. The exemplary covering 50 shown in FIG. 4 is not shown over the buttons 60 of the computer mouse 52. However, alterative exemplary embodiments may cover the buttons as well.

Figure 6:
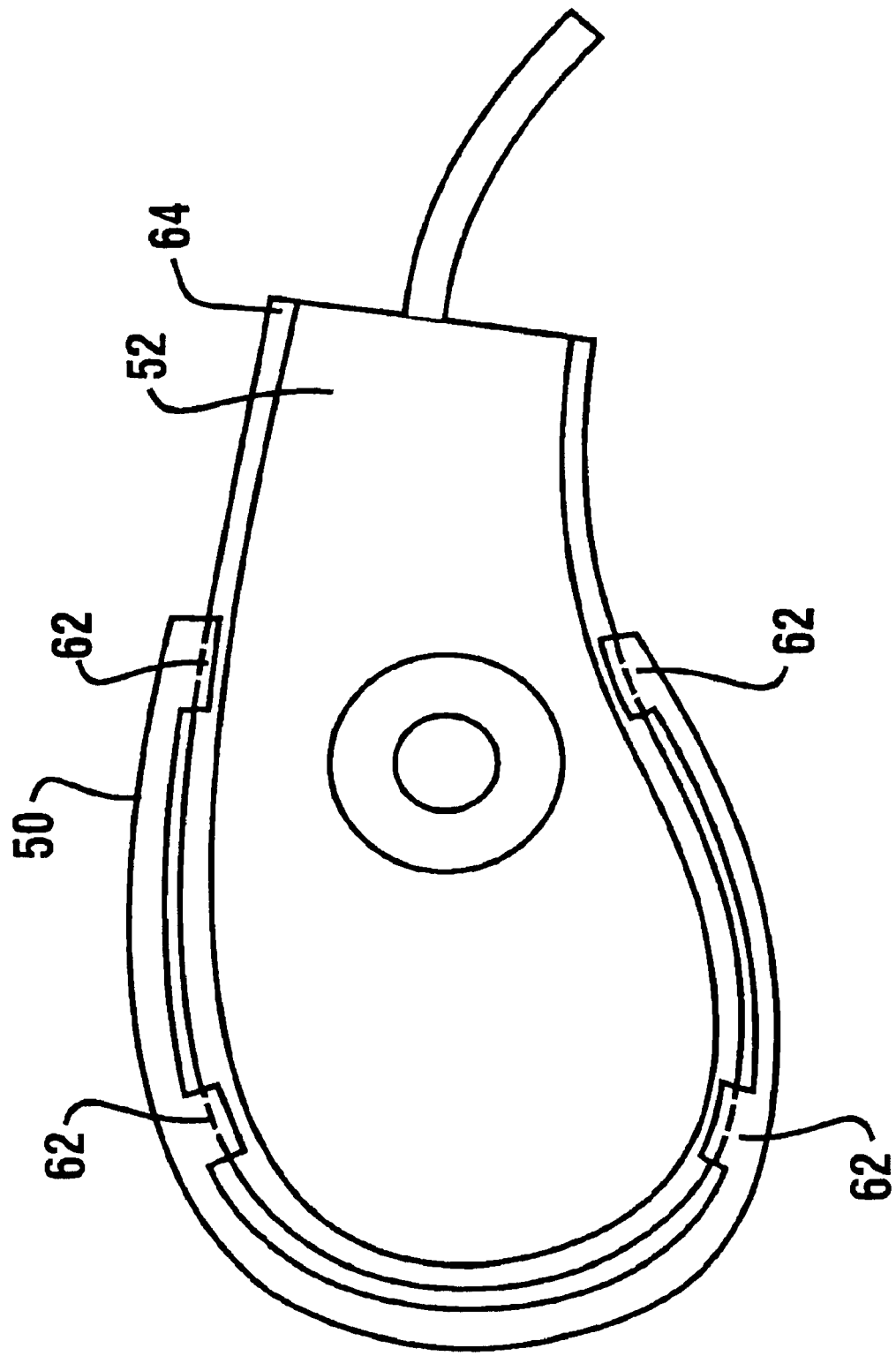
FIG. 6 is a bottom plan view representative of an exemplary embodiment of a computer mouse cover of the present invention.

In the exemplary embodiment the covering may be comprised of a plastic shell which is operative to snap in place over the body of the computer mouse. FIG. 5 shows a side plan view of the covering 50 engaged with the computer mouse 52. FIG. 6 shows a bottom plan view of the covering 50 engaged with the computer mouse 52. The exemplary embodiment of the covering 50 includes tabs 62 which are operative to engage with a lower ridge 64 of the computer mouse 52. Alternative exemplary embodiments may include one continuous tab which engages with all or a portion of the ridge 64 of the computer mouse 52.

Figure 7:
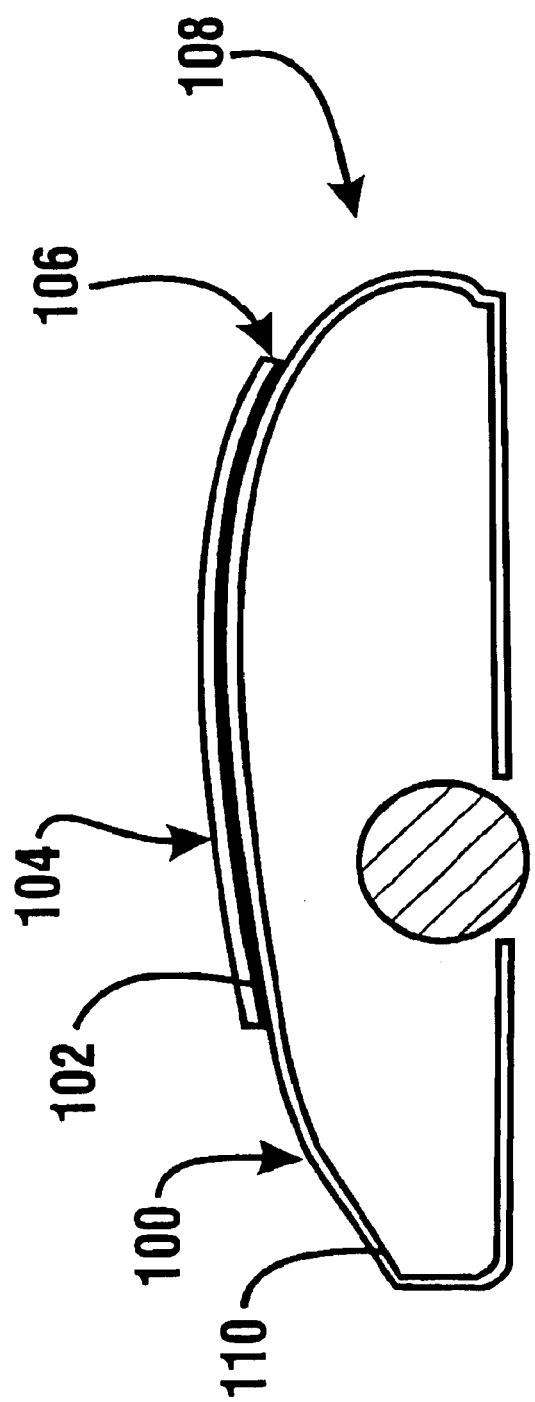
FIG. 7 is a side cross-sectional view representative of an exemplary embodiment of a computer mouse of the present invention.

As shown in FIG. 7, in alternative exemplary embodiments a covering 106 may be applied to an outer surface 100 of a body 110 of a mouse 108. The covering 106 may be comprised of a flexible and/or elastic plastic sheet 104 with a pressure sensitive adhesive layer 102. All or portions of the sheet 104 may be comprised of at least one color changing material as previously described. In an exemplary embodiment, the adhesive layer may enable the covering 106 to be in releasable connection with the body 110 of the mouse 108 such that the covering may be reapplied to another surface. During the manufacture of the covering, a removable release liner may be attached to the adhesive. Before the sheet is applied to the surface of an input device, the release liner may be peeled away to expose the adhesive material on the back side of the covering.

In further exemplary embodiments, the covering may be comprised of a coloring changing material that is woven together and which forms a shape which corresponds to the general contour of the input device. Such exemplary embodiments may also include an adhesive layer which is operative to hold the woven material to the outer shell of the computer mouse or other input device.

In an exemplary embodiment of the present invention the color changing material corresponds to any material which may be integrated into either an exterior surface of a body of an input device or may be integrated into an exterior surface of a covering for a body of an input an device. The exemplary color changing materials are operative to exhibit one or more color changes over a range of temperatures produced by contact with the body of the user. In the exemplary embodiment such color changes occur in the color changing material between 30 C and 50 C.

In one exemplary embodiment the color changing material may be comprised of thermochromic liquid crystals such as cholesteric liquid crystals. One source for the cholesteric liquid crystals being the Pressure Chemical Company of Pittsburgh, Pa.

Such color changing materials may be heated to liquifaction and a thin film thereof applied to a substrate of an exterior surface of a body of an input device or a covering for a body of an input device. In the exemplary embodiment the exterior surface includes a black or darker coloring to provide for more contrast and maximum color visibility of color changes in the applied film of color changing material. In alternative exemplary embodiments, an input device covering may be comprised of woven materials with cholesteric liquid crystals integrated therewith. Examples of techniques for integrating cholesteric liquid crystals woven materials are disclosed in Spector U.S. Pat. No. 4,642,250. The exemplary color changing material may be applied to an exterior surface substrate of an input device or a cover for an input device for example by printing, screen printing, spraying, dipping, brushing, laminating, doctor bar, and electrostatic pressing. In addition color changing materials with different ranges of temperature sensitivity may be applied randomly and/or in patterns to the exterior surface substrate.

In further exemplary embodiments of the present invention the mouse or other input device may include a body comprised of a ceramic, metal, plastic or other material which has a high heat capacity. The color changing material may be applied on top of the high heat capacity body or integrated into the high heat capacity body. The exemplary embodiment of the body of the mouse may be operative to retain thermal energy for relatively long periods of time. This enables the outer surfaces of the mouse to retain changes in color for durations of time lasting many seconds after a hand of the user is removed from the base.

In a further alternative exemplary embodiment of the present invention, the color changing materials may include thermochromic or photochromic inks or dyes comprised of a spiropyran such as inodl-inospirobenzophyrans (SP). Such thermochromic or photochromic dies may change colors or turn colorless when exposed to increases in temperatures or changes in light intensity or light frequency directed on the color changing material. Thermochromic or photochromic dies which change to different colors with increases in temperature or changes in light exposure may be applied to a surface of an input device or integrated into a base or covering of an input device as previously discussed.

For thermochromic dies which become colorless or transparent with increases in temperature, a second external layer of the thermochromic dies may be applied overtop of a body of an input device that includes a first external layer of non-color changing graphics, logos or other patterns. At ambient room temperature such thermochromic dies are operative to have a color which hides the non-color changing patterns below the external thermochromic die layer. As the temperature of the mouse increases, or as the light intensity changes, the thermochromic or photochromic dies may be operative to become transparent and enable a user to visually perceive the non-color changing patterns of the first external layer on the body of the mouse or other input device.

In exemplary embodiments, the thermochromic or photochromic inks or dies may be either reversible or irreversible. Reversible thermochromic or photochromic dies, such as the color changing materials discussed previously are operative to change back and forth between different colors as the temperature of the material increases and decreases. Irreversible thermochromic or photochromic dies are operative to change color and retain the new color after the initial stimulus (heat or light) has been removed. The color changes of irreversible thermochromic inks will remain for a long period of time until a second stimuli is applied.

When photochromic dies are used for the color changing material, the exemplary embodiment of the mouse or other input device may change between different colors depending on the brightness of the room, depending on whether the room is illuminated by natural or artificial light, or as a result of a hand or other object shielding the input device from light. For example, while a hand of a person is on top of a mouse, the covered portions may turn a different color responsive to the hand blocking light from reaching the covered portions of the mouse. When the hand is removed, an image of the person's hand on the mouse may be visually perceptible for a period of time. Eventually the light from the room will cause the previously covered portions of the mouse to return back to a similar color as the uncovered regions of the mouse.

In further exemplary embodiments, the color changing material may include liquid crystal polymers or elastomers. Polymers may be used in the present invention as thermochromic materials when suitable liquid crystal moieties are attached to the polymer such as cholesteric liquid crystal. Such polymers for example can contain liquid crystal molecules as the side chains (side chain liquid crystal polymers) or as part of the polymer backbone (main-chain liquid crystal polymer). Liquid crystal polymers have response times to external stimuli such as heat which is much slower than traditional liquid crystals due to the high viscosity of the macromolecule. As a result, input devices of the present invention are operative to retain changes in color for relatively long periods of time after a user's hand is removed from the device. As in previously exemplary embodiments, cholesteric liquid crystals polyrmers may be applied to a surface of an input of a mouse or integrated into the material which comprises the base of the input device. Cholesteric liquid crystals polymers for use with the present invention may be acquired from EM Industries of Hawthorne, N.Y.

In further exemplary embodiments, liquid crystal polymer composite films may be used as the color changing material of the present invention. Such liquid crystal polymer composite films may include liquid crystals dispersed in the polymer matrix to form an emulsion of liquid crystal and polymer (polyvinyl alcohol-based or polyurethane-based latex paint). In exemplary embodiments, crystal polymer composite films may be spin-coated or cast on a substrate of the computer input device.

In one example, liquid crystal polymer composite films may be prepared by mixing cholesteric liquid crystal with an epoxy such as Devcon 5 Minute Epoxy of UHU America, Inc., Readfield, Me. Liquid crystal polymer composite films may also be prepared by mixing cholesteric liquid crystals with commercial polymers such as poly(methyl methacrylate) (PMMA), poly(isobornyl methacrylate) (PIMA), poly(vinyl alcohol) PVA, poly(vinyl butyral) (PVB), and poly(vinyl butyral-covinyl alcohol-co-vinyl acetate). Such polymers may be obtained for example from Sigma-Aldrich of St. Louis, Mo.

The cholesteric liquid crystals may be mixed with a polymer at a ratio that includes the liquid crystals in the range of 50% to 80% of the composition. Polymers such as PMMA, PIMA, and PVA, may be mixed with liquid crystals by first heating the polymers to a transparent liquid. Such a composite may be applied to a surface of an input device such as a mouse by lamination or sandwiching the mixture between two substrates. Different color changing characteristics may be achieved by cooling the film to room temperature at different rates, and using different types or thicknesses of substrates with different levels of heat capacity.

In a further example, cholesteric liquid crystals may be mixed with a UV resin such that the cholesteric liquid crystals range from 70% to 80% of the composition. The mixture may then be applied to the input device surface and cured with UV lamps. UV resin can be purchased from Edmund Industrial Optics of Barrington, N.J.

As discussed previously with respect to color changing materials being integrated into an exterior surface of a covering for an input device, such covering may include a protective sheet adjacent the adhesive layer. When a user is ready to mount the covering to an input device, the protective sheet may be peeled away from the covering and the covering may then be attached to the outer surfaces of the input device.

Figure 8:
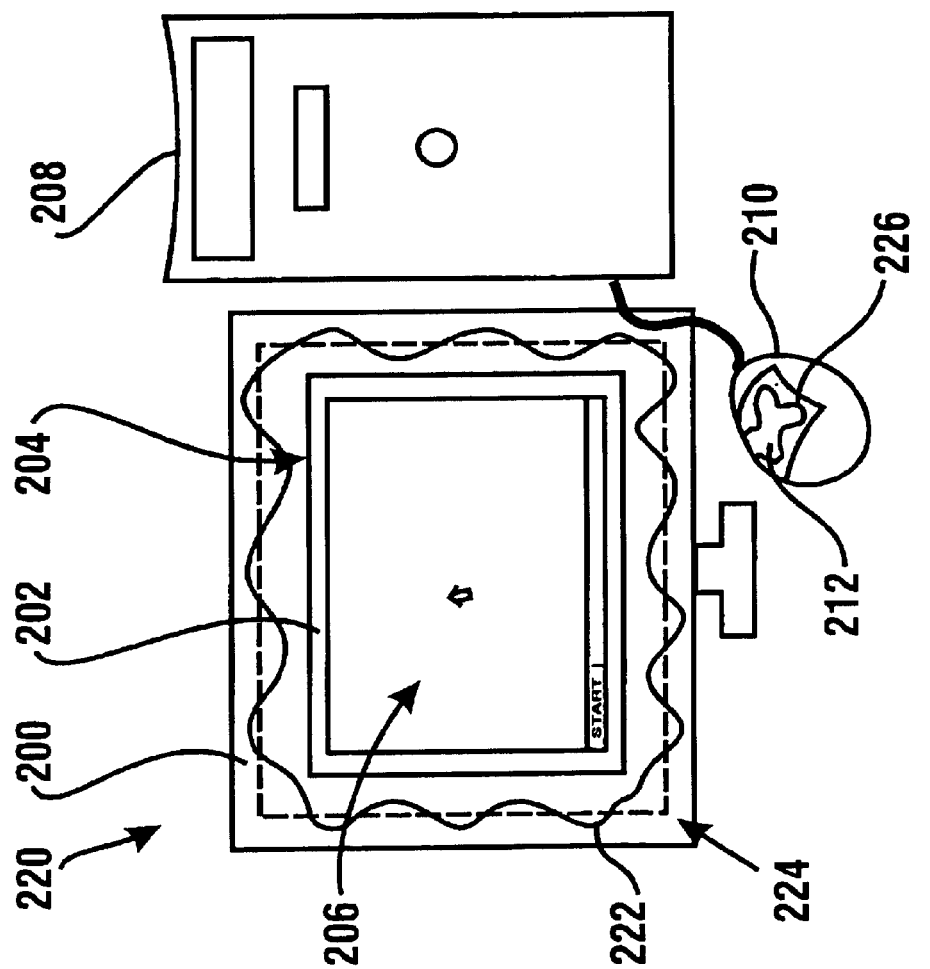
FIG. 8 shows a computer system with an exemplary embodiment of a computer mouse and machining monitor frame of the present invention.

In further exemplary embodiments, coverings with similar visual characteristics, indicia, and patterns may be attached to other components of computer devices in addition to input devices. For example as shown in FIG. 8 a covering 200 with a rectangular opening 204 may be attached to the outer frame 202 of a monitor 220. Such a monitor may have a display device such as a CRT or LCD screen 206 which is operative to output a user interface responsive to a computer device 208 such as a personal computer or a game controller. The covering may include an exterior surface 224 with visible indicia 222 that is visually similar to visible indicia 226 on a covering 212 of an input device 210 that is also attached to the computer device 208.

In an exemplary embodiment, the covering for the monitor may also include an exterior surface comprised of a color changing material that is responsive to heat or pressure from a user's hand to change color. The exemplary covering for the monitor may also include a pressure sensitive adhesive layer or other fastening device which is operative to removably attach the covering to the monitor.

In further alterative exemplary embodiments, coverings for both an input device and a monitor of a computer device may include matching exterior surfaces with coordinating patterns, colors, and indicia related to a common subject matter. For example, exemplary embodiments may include a mouse covering and a monitoring covering that are sold or packaged as a set and include matching logos, advertisements, images, patterns, or any other coordinating information which can be applied to the exterior surfaces of coverings for both input devices and monitors.

Figure 9:
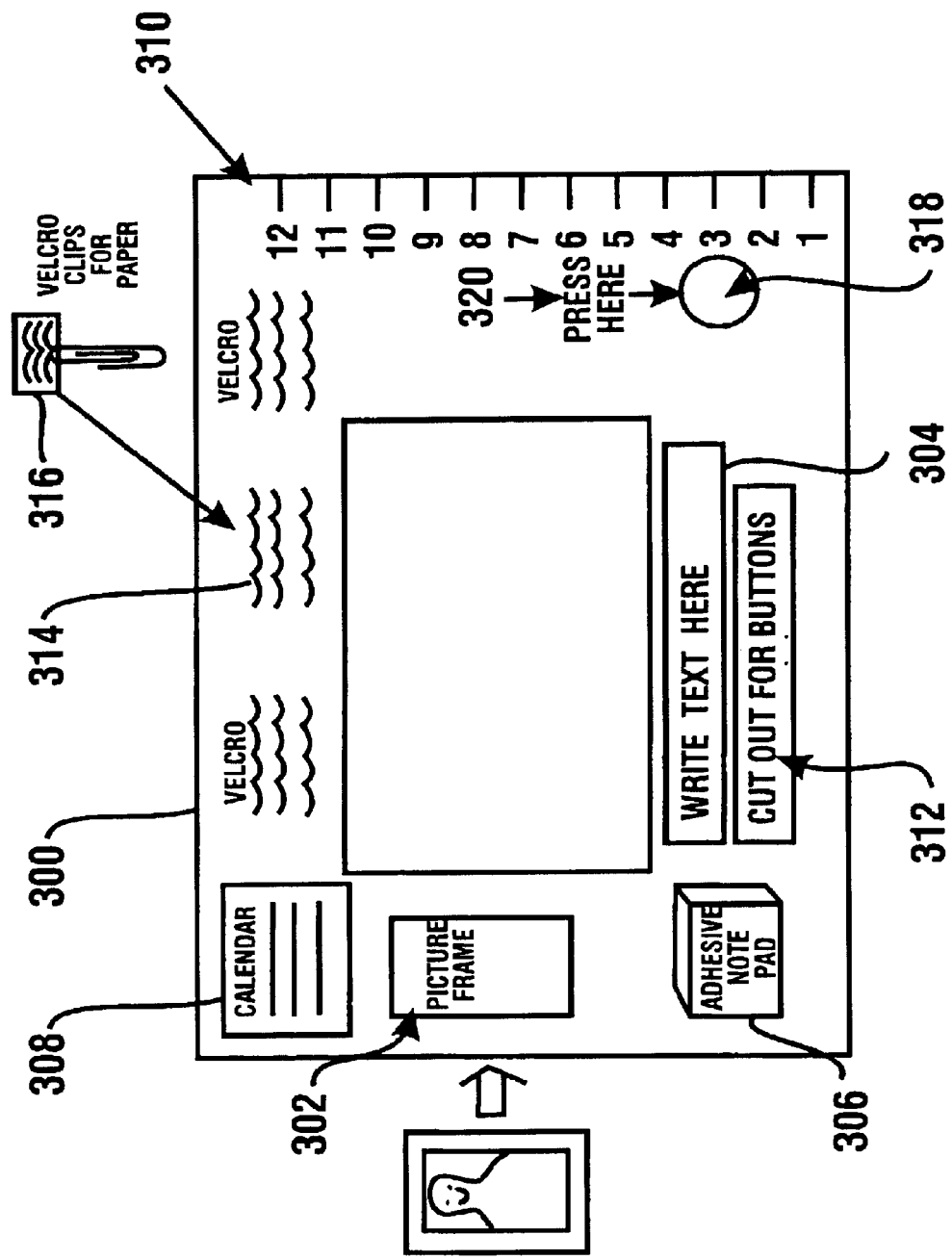
FIG. 9 shows a front plan view representative of an exemplary embodiment of a monitor frame of the present invention.

As shown in FIG. 9, in further exemplary embodiments, a monitor covering 300 may include portions such as a photograph frame 302 adapted to accept photographs for display through the monitor covering. The monitor covering may further include a dry ink board 304 for writing erasable messages. In addition the monitor covering 300 may include an adhesive note pad 306 with peel off note paper. Also the covering may include one or more year calendar(s) 308. In further exemplary embodiments the covering may include markings for making measurements such as a ruler portion 310. For monitors that include buttons, the covering may include further openings 312 to enable access to the buttons on the monitor.

Further exemplary embodiments of the covering 300 may also include velcro 314 or other fasteners for attaching removable paper clips 316. Other exemplary embodiments of the covering may include a tray for paper clips, writing implements, or other portable objects. In these described exemplary embodiments of the covering, the covering may include a portion 318 with a color changing material. Indicia 320 on the covering may prompt a user to press the color changing material 318 to gauge his temperature and/or mood based on the color that the material 318 changes to. However it is to be understood that other exemplary embodiments of the monitor covering may not include color changing material. Also, as shown in FIG. 10, exemplary embodiments of the monitor covering 400 may include an outer contour 402 that is curved in the shape of an object such as cartoon character, race car, or any other visually perceptible shape.

Thus the new input device of the present invention achieves one or more of the above stated objectives; eliminates difficulties encountered in the use of prior devices and systems; solves problems; and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. An input device comprising:
    an input mechanism, wherein the input mechanism is operative responsive to movements of a user of the device to send inputs to a computer system; and
    a body in operative connection with the input mechanism, wherein the body includes an exterior surface that is operative to come in contact with the user of the device, wherein the exterior surface includes a first layer and a second layer disposed on top of the first layer, wherein the second layer is substantially opaque at a generally ambient room temperature, and wherein the second layer is operative to change from being substantially opaque to being substantially transparent responsive to an increase in temperature of the second layer caused by heat transferring into the second layer from a hand of the user of the device, whereby the first layer becomes visible through the second layer, wherein the second layer is operative to change from being substantially transparent to being substantially opaque when the second layer decreases in temperature responsive to the hand of the user of the device being removed from contact with the exterior surface.

2. The input device according to claim 1, wherein at least one portion of the first layer includes a plurality of graphical shapes, wherein as the temperature of the second layer increases to a first temperature, at least one first one of the graphical shapes becomes visually perceivable, wherein as the temperature of the second layer increases from the first temperature to a second temperature at least one second one of the graphical shapes becomes visually perceivable.

3. The input device according to claim 2, wherein the graphical shapes include alphabetic letters.

4. The input device according to claim 1, wherein the input mechanism corresponds to a pointing device.

5. The input device according to claim 1, wherein the input mechanism corresponds to a computer mouse.

6. The input device according to claim 1, wherein the input mechanism corresponds to a game controller.

7. The input device according to claim 1, wherein the input mechanism corresponds to a trackball.

8. The input device according to claim 1, wherein the input mechanism corresponds to a joystick.

9. The input device according to claim 1, wherein the second layer includes a thermochromic dye.

10. The input device according to claim 1, wherein the second layer includes a liquid crystal polymer.

11. The input device according to claim 1, wherein the second layer includes a liquid crystal polymer composite film.

12. The input device according to claim 1, wherein the exterior surface includes a sheet with a pressure sensitive adhesive backing, wherein the sheet is adhesively connected to the body of the input device.

13. The input device according to claim 1, wherein the body is comprised of a plastic with at least one color changing material integrated in the second layer.

14. The input device according to claim 1, wherein the first layer includes at least one image which becomes visible through the second layer as the second layer becomes substantially transparent.

15. The input device according to claim 1, wherein the first layer includes indicia thereon with a plurality of different colors.

16. The input device according to claim 11, wherein the first layer includes at least one word which becomes visible as the second layer becomes substantially transparent.

17. An input device comprising:

an input mechanism, wherein the input mechanism is operative responsive to movements of a user of the device to send inputs to a computer system, wherein the input mechanism includes;

an exterior surface that is operative to come in contact with the user of the device, wherein the exterior surface includes a first layer and a second layer, wherein the second layer is disposed above the first layer, wherein the second layer is operative to change from being substantially opaque at a first temperature to being substantially transparent at a second temperature responsive to beat from the user, wherein the second temperature is higher than the first temperature, wherein at least portions of the first layer become substantially visible through the second layer when the second layer changes from being substantially opaque to being substantially transparent, wherein the second layer is operative to change from being substantially transparent to being substantially opaque, wherein the portions of the first layer become substantially not visible through the second layer when the second layer changes from being substantially transparent to being substantially opaque.

18. The input device according to claim 17, wherein the input mechanism includes a mouse.

19. The input device according to claim 18, wherein the second temperature is at least one of less then or equal to the temperature of a hand of the user.

20. The input device according to claim 17, wherein the second layer is substantially clear at the second temperature.

21. The input device according to claim 17, wherein the first layer includes an image which is substantially not visible through the second layer at the first temperature of the second layer and is substantially visible through the second layer at the second temperature of the second layer.

22. A method comprising:

a) providing an input device, wherein the input device is adapted to communicate inputs to a computer system responsive to movements of a user;

b) mounting an exterior surface to the input device, wherein the exterior surface is operative to come in contact with the user of the device, wherein the exterior surface includes a first layer and a second layer, wherein the second layer is disposed above the first layer, wherein the second layer is operative to change from being substantially opaque at a first temperature to being substantially transparent at a second temperature responsive to heat from the user, wherein the second temperature is higher than the first temperature, wherein at least portions of the first layer become substantially visible through the second layer when the second layer changes from being substantially opaque to being substantially transparent, wherein the second layer is operative to change from being substantially transparent to being substantially opaque, wherein the portions of the first layer become substantially not visible through the second layer when the second layer changes from being substantially transparent to being substantially opaque.

23. The input device according to claim 22, wherein (b) includes mounting an enclosure body to the input device, wherein the enclosure body includes the exterior surface.

24. The input device according to claim 22, wherein (b) includes mounting a flexible sheet with an adhesive to the input device, wherein the flexible sheet includes the exterior layer.

* * * * *